US012674532B2

(12) United States Patent
Kroczek et al.

(10) Patent No.: US 12,674,532 B2
(45) Date of Patent: Jul. 7, 2026

(54) WATER PORT CLOSURE ASSEMBLY

(71) Applicant: Goodrich Corporation, Charlotte, NC (US)

(72) Inventors: Piotr Jacek Kroczek, Nieciszów (PL); Paweł Świrniak, Prochowice (PL); Krzysztof Słomiany, Jerzmanowice (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/774,092

(22) Filed: Jul. 16, 2024

(65) Prior Publication Data

US 2025/0027300 A1 Jan. 23, 2025

(30) Foreign Application Priority Data

Jul. 20, 2023 (EP) ..................................... 23461629

(51) Int. Cl.
*F16L 29/02* (2006.01)
*B64D 11/04* (2006.01)
*F16K 3/08* (2006.01)

(52) U.S. Cl.
CPC .............. *F16L 29/02* (2013.01); *B64D 11/04* (2013.01); *F16K 3/085* (2013.01)

(58) Field of Classification Search
CPC . F16L 29/02; F16L 37/46; F16L 37/40; F16L 29/002; F16L 37/47; F16L 39/00;
(Continued)

(56) References Cited

U.S. PATENT DOCUMENTS 293,240 A * 2/1884 Goldsmith ................ F16K 3/08
251/185
3,026,899 A * 3/1962 Mischanski ............. F16K 3/085
251/304
(Continued)

FOREIGN PATENT DOCUMENTS

DE 1153581 B * 8/1963
EP 4145034 A1 3/2023
(Continued)

OTHER PUBLICATIONS

European Search Report for Application No. 23461629.0, mailed Dec. 15, 2023, 9 pages.

*Primary Examiner* — David Colon-Morales
(74) *Attorney, Agent, or Firm* — CANTOR COLBURN LLP

(57) ABSTRACT

A hydraulic port assembly includes a housing having an opening therethrough; a first port located in and extending through the opening defining a flow channel through the fill port from a first end to a second end, the flow channel having an axis (A) defined between the first end and the second end and a closure mechanism moveable between an open position in which the flow channel is open and allows fluid flow therethrough and a closed position in which the flow channel is closed and prevents fluid flow therethrough. The closure mechanism includes: a filter unit comprising a first filter part located in the flow channel, and having perforations formed therein to allow fluid flow in the flow channel through the first filter part; and a second filter part located in the flow channel axially adjacent the first filter element.

14 Claims, 9 Drawing Sheets

(58) Field of Classification Search
CPC ...... F16L 37/56; F16K 3/085; F16K 31/5286;
B64D 11/04; B64D 11/02
See application file for complete search history.

(56) References Cited

U.S. PATENT DOCUMENTS

| | | | | |
|---|---|---|---|---|
| 3,426,797 | A * | 2/1969 | Baker | F16K 3/085 |
| | | | | 251/340 |
| 3,843,172 | A * | 10/1974 | Stevens, Jr. | F16L 29/02 |
| | | | | 285/38 |
| 4,360,040 | A * | 11/1982 | Cove | F16K 3/34 |
| | | | | 137/625.3 |
| 4,395,019 | A * | 7/1983 | Searles | F16K 3/085 |
| | | | | 137/329.01 |
| 4,549,579 | A * | 10/1985 | Bergmann | F16K 3/085 |
| | | | | 137/625.21 |
| 4,554,948 | A * | 11/1985 | Bergmann | F16K 3/085 |
| | | | | 251/304 |
| 4,848,403 | A * | 7/1989 | Pilolla | F16K 3/085 |
| | | | | 251/304 |
| 5,025,832 | A * | 6/1991 | Taylor | F16K 3/085 |
| | | | | 251/208 |
| 5,025,833 | A * | 6/1991 | Hendrick | F16K 3/085 |
| | | | | 251/118 |
| 5,063,954 | A * | 11/1991 | Hendrick | F16K 3/08 |
| | | | | 251/118 |
| 5,088,689 | A * | 2/1992 | Hendricks | F16K 3/085 |
| | | | | 251/304 |
| 6,928,814 | B2 * | 8/2005 | Lange | F16L 37/44 |
| | | | | 60/585 |
| 6,959,729 | B2 * | 11/2005 | Graber | F16K 3/085 |
| | | | | 251/340 |
| 7,299,823 | B2 * | 11/2007 | Smith | F16L 29/02 |
| | | | | 251/149.6 |
| 7,726,338 | B2 * | 6/2010 | Clasen | F16K 3/085 |
| | | | | 251/304 |
| 8,398,052 | B2 * | 3/2013 | Svensson | F16L 39/00 |
| | | | | 251/149.6 |
| 8,776,637 | B2 * | 7/2014 | Juhassz | F16L 37/40 |
| | | | | 141/351 |
| 9,770,978 | B2 | 9/2017 | Rejman et al. | |
| 10,099,827 | B1 | 10/2018 | Levy Sarraf | |
| 10,197,201 | B2 * | 2/2019 | Ferrara | F16L 37/42 |
| 10,436,365 | B2 * | 10/2019 | Remfry | F16L 37/08 |
| 10,871,234 | B2 * | 12/2020 | Miller | F16K 3/08 |
| 11,746,942 | B2 * | 9/2023 | Durieux | F16L 37/56 |
| | | | | 251/149.6 |
| 11,867,302 | B2 * | 1/2024 | Molina | F16K 15/182 |
| 11,885,438 | B2 * | 1/2024 | Haro-Valdez | F16K 5/0407 |
| 11,927,290 | B2 * | 3/2024 | Le Polotec | F16L 39/00 |
| 12,123,526 | B2 * | 10/2024 | Yuen | F16L 29/002 |
| 12,188,734 | B2 * | 1/2025 | Chen | G06F 1/20 |
| 12,292,150 | B2 * | 5/2025 | Kroczek | F16L 55/1018 |
| 12,404,937 | B2 * | 9/2025 | Rosenthal | F16K 3/029 |
| 2006/0214419 | A1 * | 9/2006 | Heuer | F16L 41/12 |
| | | | | 285/142.1 |
| 2023/0081636 | A1 * | 3/2023 | Swirniak | F16K 31/52441 |
| | | | | 137/625 |
| 2024/0218953 | A1 * | 7/2024 | Kroczek | H05B 3/267 |
| 2024/0253894 | A1 * | 8/2024 | Kroczek | F16L 55/1157 |
| 2024/0253969 | A1 * | 8/2024 | Kroczek | F16L 37/56 |

FOREIGN PATENT DOCUMENTS

| | | | | |
|---|---|---|---|---|
| WO | | 9407752 A1 | 4/1994 | |
| WO | WO-2005124218 A1 * | 12/2005 | | F16L 37/56 |

* cited by examiner

WATER PORT CLOSURE ASSEMBLY

CROSS-REFERENCE TO RELATED APPLICATIONS

This application claims the benefit of European Patent Application No. 23461629.0 filed Jul. 20, 2023, the disclosure of which is incorporated herein by reference in its entirety.

TECHNICAL FIELD

The present disclosure is concerned with providing a closure assembly for ports in a water system, such as the fill and overflow ports of a water system. The water system can, for example, be a system for providing potable or fresh water in an aircraft.

BACKGROUND

Water systems often include a tank or storage vessel to store water which can then be plumbed to other parts of the system to provide water to different parts of the system from the storage tank/vessel. The tank will need to be periodically re-filled. Typically, the tank is provided with a fill port to which a fill line, connected to a source of water, is connected for re-filling the tank from the source. The tank may also be provided with an overflow or overfill line via which water can exit the tank if the tank is overfilled. The overflow water exits from an overflow port on the tank. During the tank filling process, the fill port, and, where present, the overflow port, will be open. In some applications, the ports are left open after filling. The ports may be provided in an operating panel that is covered by a door or panel when not in use. In certain environments, e.g. where the tank is subjected to movement or vibration or in environments where debris or contaminants exits which should not be allowed to get into the tank, a closure or cap assembly is provided at the ports to close the port(s) when not being filled. In an arrangement with a fill port and an overflow port, each port may be provided with its own cap or closure or, alternatively, a single closure can be provided that covers both ports, when closed. Such assemblies may be used, for example, in aircraft. An aircraft typically has water stations in the cabin for dispensing drinking water during flight. The aircraft has a storage tank filled with potable water and plumbing to provide water from the tank to the stations as required. The tank is re-filled between flights by ground crew, by connecting an external source of water, e.g. a water truck, to the tank via a hose connected to the fill line attached to the fill port.

Whilst existing closure arrangements are effective in closing the ports, they are typically hinged relative to the ports in such a way that they require a large area around the ports to allow them to open and close. Typically, an arm or lever is attached to the caps and is moved in a large arc to open the caps. In environments where space is limited e.g. in aircraft, this is undesirable and there is a need for an improved port closure assembly that provides effective closure but also allows the closure to be opened and closed within a limited space. In addition, repeated opening and closing of the closure components about a hinge causes wear and means that the parts need to be replaced long before their life would otherwise expire.

SUMMARY

According to the disclosure, there is provided a hydraulic port assembly comprising: a housing having an opening therethrough; a first port located in and extending through the opening defining a flow channel through the fill port from a first end to a second end, the flow channel having an axis defined between the first end and the second end; and a closure mechanism moveable between an open position in which the flow channel is open and allows fluid flow therethrough and a closed position in which the flow channel is closed and prevents fluid flow therethrough, wherein the closure mechanism comprises: a filter unit comprising a first filter part located in the flow channel, and having perforations formed therein to allow fluid flow in the flow channel through the first filter part; and a second filter part located in the flow channel axially adjacent the first filter element, the second filter element being rotatable about the axis relative to the first filter element, the second filter element having perforations formed therein to allow fluid flow in the flow channel through the second filter part, the second filter part rotatable, relative to the first filter part, about the axis between a first position in which the perforations of the second filter part are aligned with the perforations of the first filter part allowing fluid flow through the filter unit, and a second position in which the perforations of the second filter part are not aligned with the perforations of the first filter part such as to prevent fluid flow through the filter unit.

BRIEF DESCRIPTION OF FIGURES

Examples of the assembly according to this disclosure will be described by way of example only and with reference to the drawings. It should be noted that variations are possible within the scope of the claims.

DETAILED DESCRIPTION

Figure 1:
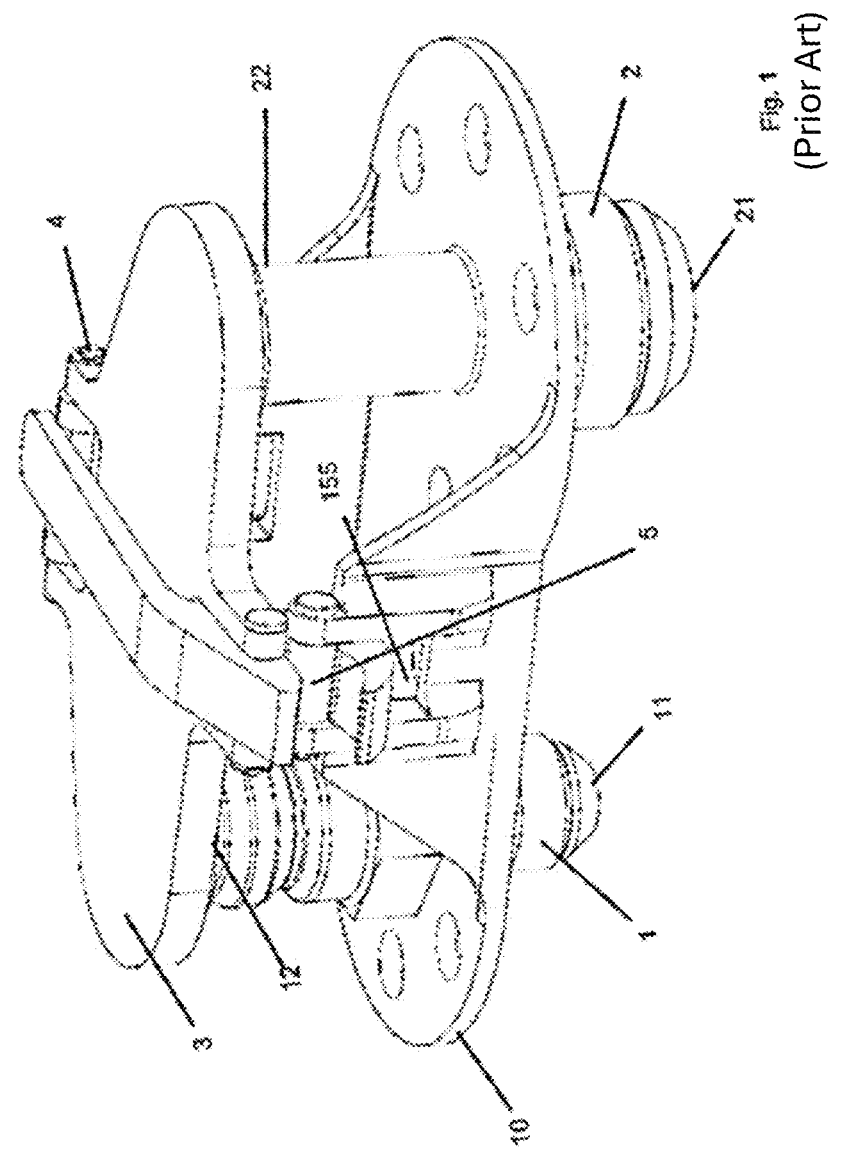
FIG. 1 is a perspective view of an example of a known closure assembly for a fill port and an overflow port of a water system.

By way of background, an example of a known port closure assembly will first be described, with reference to FIGS. 1, 2A and 2B.

In this assembly, a fill port 1 and an overflow port 2 are provided in a housing 10, and are configured to be attached to a tank to be filled via the assembly. The first end 12 of the fill port 1 is provided with a respective fitting 31 configured to be fluidly connected to a fill line (not shown) when the tank is being filled. The first end 22 of the overflow port 2 is provided with a fitting configured to be fluidly connected to an overflow line (not shown). A cap 3 is provided to cover the first ends 12, 22 of the fill and overflow ports in the closed state. In the example shown, a single cap is provided that covers both ports 1, 2 as this simplifies the closing operation by the user and reduces the risk of a port being inadvertently left open after filling. Other known assemblies have a separate cap for each port.

The cap 3 is mounted to the assembly housing 10 by a hinge arrangement 4 adjacent the first ends of the ports, and is provided with a lever and latch mechanism 5 to open and close the cap 3. The inner surface of the cap, that comes into contact with the first end of the port(s) when closed, is preferably provided with a seal 6. An additional seal, such as an O-ring seal 7, may also be provided around the first end of the port(s). The inner surface of the cap may be formed with respective plugs or protrusions 41, 42 arranged to fit into the port fittings when the cap is closed.

In the example, the latch and lever mechanism includes a lever 15 having a lever body 151, a lever end 152 and a latch end 153. When the cap 3 is in the closed position, the lever body 151 lies across the outer surface of the cap, essentially flat against the cap, with the lever end 152 adjacent the hinge 4. The latch end 153 includes a catch or claw 154 that secures in a recess or detent 155 on the side of the housing opposite the hinge 4. The closed position is shown in FIG. 2A.

Figure 2A:
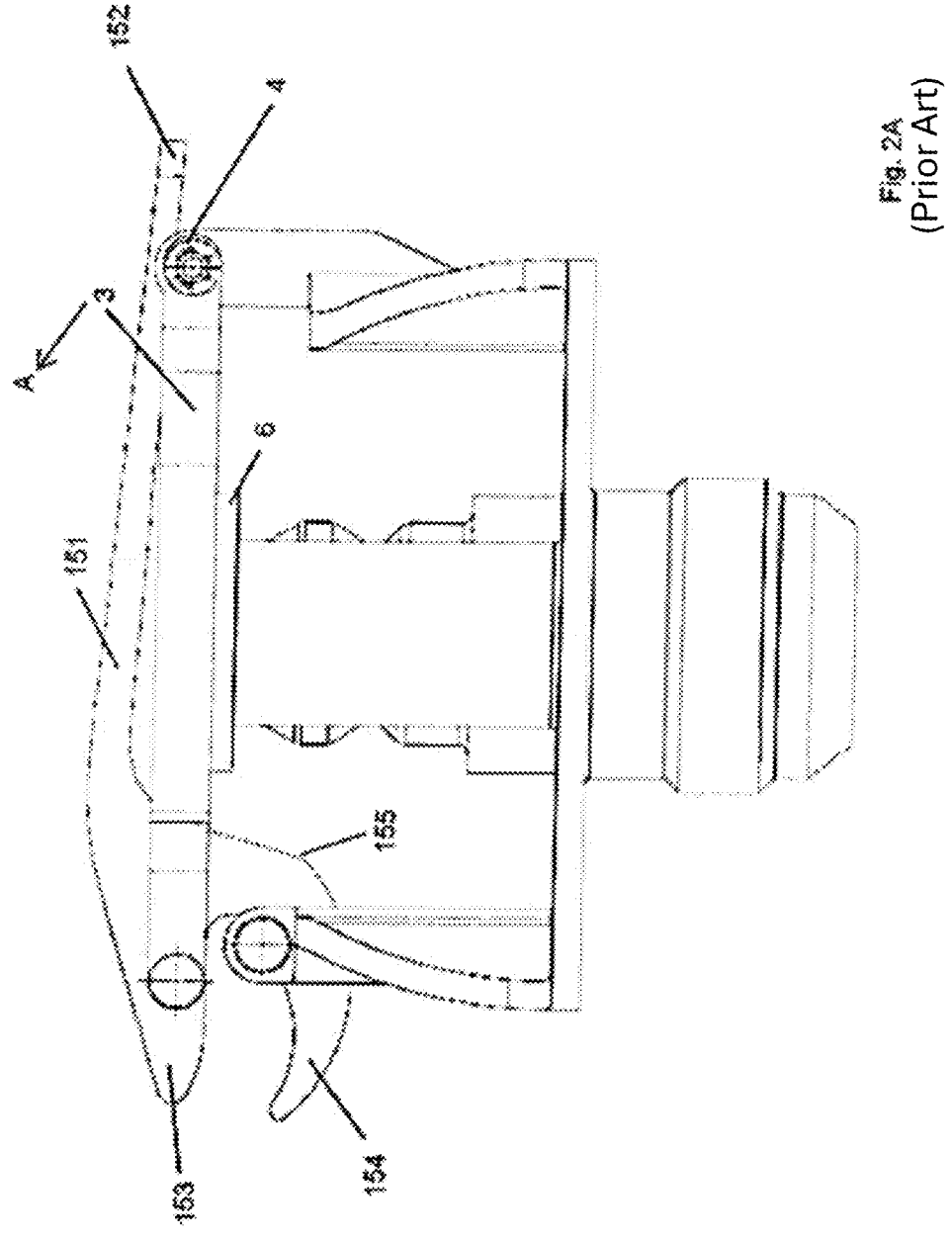
FIGS. 2A and 2B illustrate, respectively, an assembly such as that shown in FIG. 1 in the closed and opened positions

To open the cap 3, the lever end 152 first needs to be lifted away from the cap, in the direction of arrow A in FIG. 2A to cause the latch end 153 to move the claw 154 out of engagement with the detent 155. The lever 15 is then moved in an arc movement (arrow B in FIG. 2B) about the hinge 4. As the latch end of the lever is attached to the cap 3 (e.g. by a pin 8), the movement of the latch causes corresponding movement of the cap 3 about the hinge 4 to move the cap 3 out of engagement with the first end of the port(s) (FIG. 2B). In an example, not shown, where each port has its own cap, the opening motion would be similar for each cap 3.

To close the cap 3, the lever 15 is then moved in an arc relative to the housing (arrow C in FIG. 2B) opposite to the opening direction B, moving the lever and the cap about the hinge 4 to close over the port and to bring the latch end 154 into engagement with the detent 155. The lever is then brought down (arrow D) towards the outer surface of the cap 3 to the original position, essentially flat against the cap 3 (FIG. 2A) and the latch end locks behind the detent.

Figure 2B:
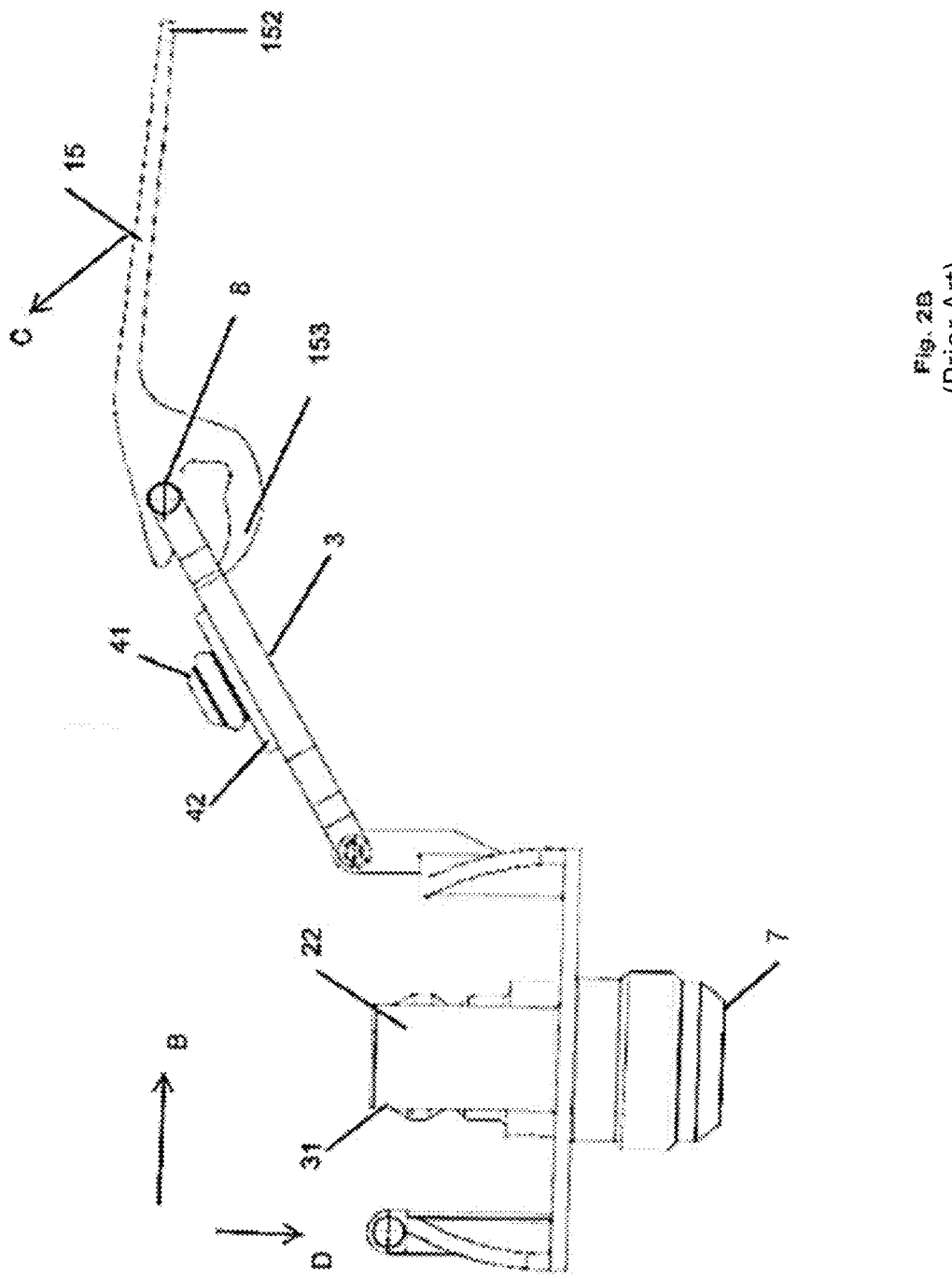

As can be seen from, in particular, FIG. 2B, the arcuate motion of the lever and the cap defines a large range of movement relative to the size of the overall assembly and would require a large area above the ports to allow the cap to be opened and closed.

Another problem that has been observed with such assemblies, is that due to the hinge arrangement between the cap and the port, the seals on the inner surface of the cap and/or between the cap and the port or fitting suffer from unequal loading during opening and closing of the caps. The parts of the seal closer to the hinge will become pinched and suffer excess loading compared to the seal parts further away from the hinge. Also, because of the rotational motion in bringing the cap into position on the port, there is a risk that the cap parts will not immediately locate in the correct central position, and can press on the seals. This can cause uneven wear on the seals and adversely affect their proper functioning.

The repeated movement of the lever about the hinge also causes wear of the closure parts including the hinge part of the housing. As this is formed integrally with the housing, which is a fully machined part, such a housing is expensive and time consuming to manufacture.

The present disclosure provides a hydraulic port assembly having an improved closure assembly that is integrated in a hydraulic port e.g. the fill port, and requires less space to open and close the cap(s), and that is smaller and simpler and less expensive to manufacture. The assembly can also address the problem of uneven wear on the seals and wear on the latch and hinge parts. An example will be described with reference to FIGS. 3 to 9.

In the same way as shown in FIGS. 1 and 2, the closure assembly of the disclosure is provided for a fill port 100 and an overflow port provided in a housing 10'. The present disclosure can be applied to other hydraulic ports other than fill and/or overflow ports, but will be described here in relation to a fill port by way of example. As in the example described above, the first end 101 of the fill port and the first end of the overflow port are configured to fluidly connect to the storage tank. The fittings at the second ends of the ports are configured to, respectively, fluidly connect to the fill line and the overflow line (not shown) during filling. A flow channel 111, 102 extends from the fittings, through the port, to the first ends. The closure assembly of this disclosure is, however, different to the known assembly described above. Rather than the closure being in the form of a cap provided over the fill ports, the closure is formed within the fill port as will be described further below, and may be activated to open when a connector e.g. of a fill hose is connected to the port and/or to close when a connector/fill hose is detached from the port.

The closure assembly according to this disclosure includes a first filter part 200 having perforations 202 (see FIG. 6) formed therein, arranged to be located in the fill port 100 extending across the flow channel 102 between the first and second ends 103, 104 of the fill port 100. In some examples, the assembly may make use of the filter that will typically be included in a fill port. This is often a mandatory requirement for fill ports to avoid ingress of contaminants via the fill port. Conventionally, a filter plate having perforations formed therein is located within the fill port, extending across the flow channel formed between the first and second ends of the fill port. The perforations are sized to prevent debris or contaminants passing through the filter to the second end of the fill port. The closure assembly of this disclosure may use this filter as the first filter part 200. In a fill port assembly that does not already include such a filter, the closure assembly of this disclosure provides a first filter part 200 comprising a filter plate 201 (see FIG. 6) having perforations 202 formed therein, arranged to be located within the fill port 100, extending across the flow channel 102 formed between the first and second ends 103, 104 of the fill port.

The closure assembly of the disclosure also comprises a second filter part 300 having perforations formed therein (see FIG. 6), arranged to be located in the fill port extending across the flow channel between the first and second ends of the fill port, the second filter part 300 being rotatable (about the fill port axis A extending in the fluid flow direction) relative to the first filter part (200), and wherein, as best seen in FIGS. 8A and 8B) the perforations 202 of the first filter part 200 and the perforations 302 of the second filter part 300 are arranged such that in a first position of rotation of the second filter part relative to the first filter part, the perforations of the second filter part are aligned with the perforations of the first filter part to permit fluid flow through the aligned perforations, and in a second position of rotation of the second filter part relative to the first filter part, the perforations of the second filter part are out of alignment with the perforations of the first filter part such that the second filter part prevents the flow of fluid past the first and second filter parts.

In one example, the closure assembly can be configured with means for applying rotation to the second filter part. This may be implemented (as described further below) such that application of an external force to the second filter part, e.g. an axial force such as may be provided when a hose or connected is attached to the first end of the fill port causes the second filter part to rotate, relative to the first filter part, to the second position. The assembly may also be configured such that the second filter is biased to return to the first position when such force is removed. In an example, described further below, the closure assembly includes a spring 500 arranged to hold the second filter part axially relative to the first filter part but to permit the second filter part to rotate relative to the first filter part.

Examples will now be described in more detail, with reference to FIGS. 3 to 9.

Figure 3:
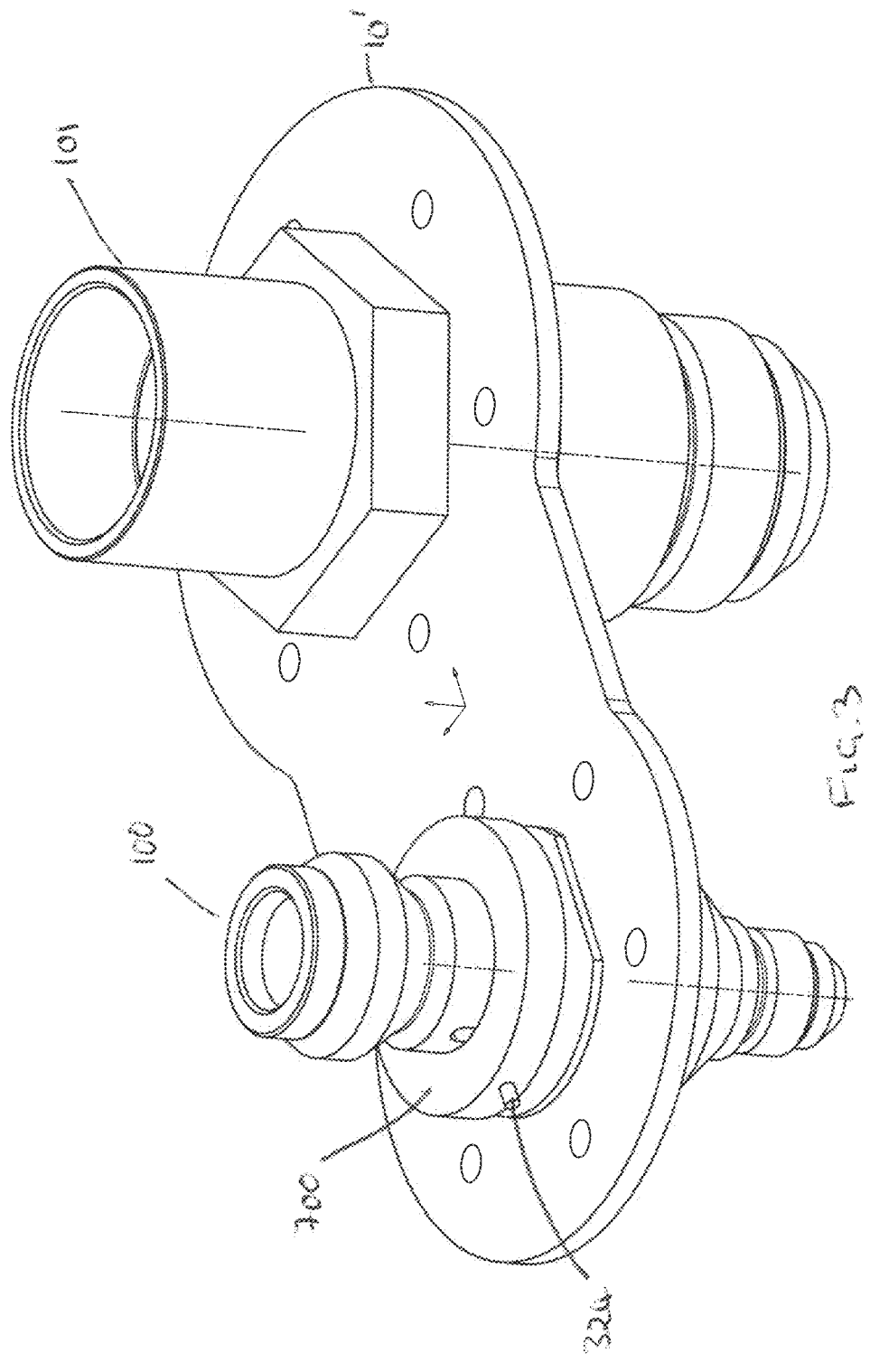
FIG. 3 is a perspective view of an example of a closure assembly according to this disclosure.
Figure 4:
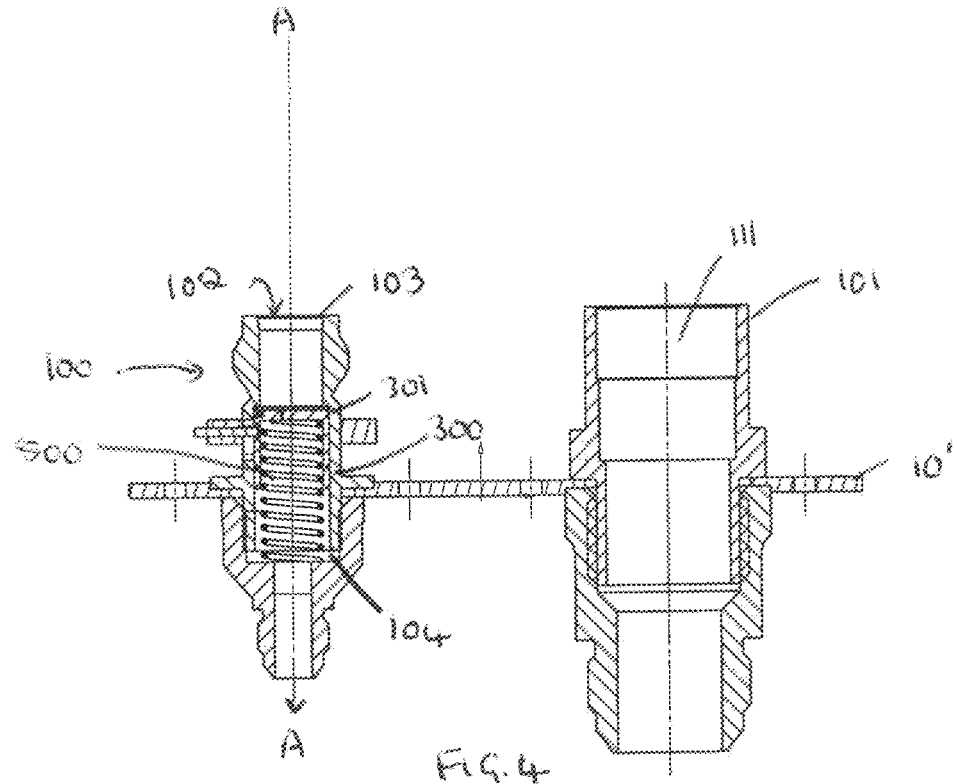
FIG. 4 is a sectional view of a closure assembly as shown in FIG. 3.
Figure 5:
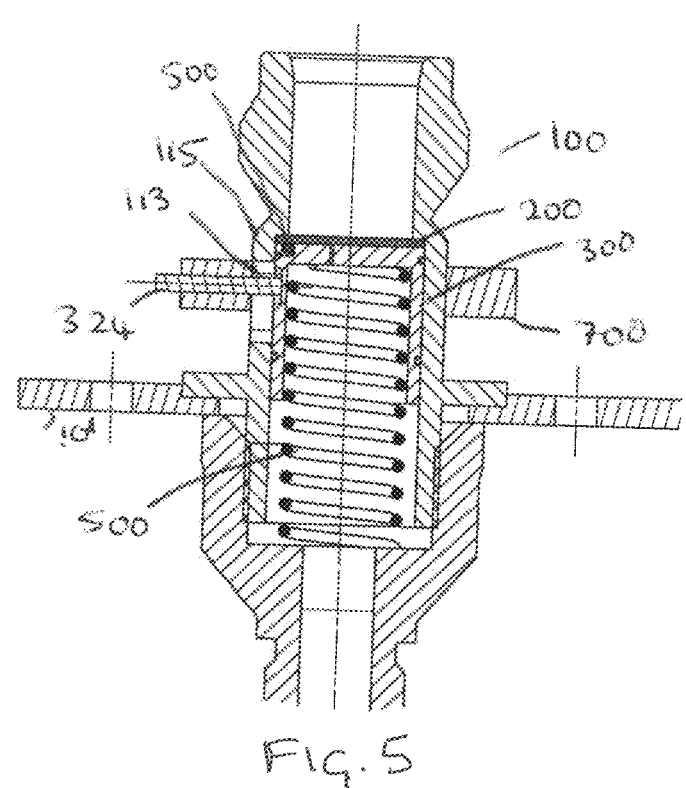
FIG. 5 is a detailed view of part of a closure assembly as shown in FIG. 3.
Figure 6:
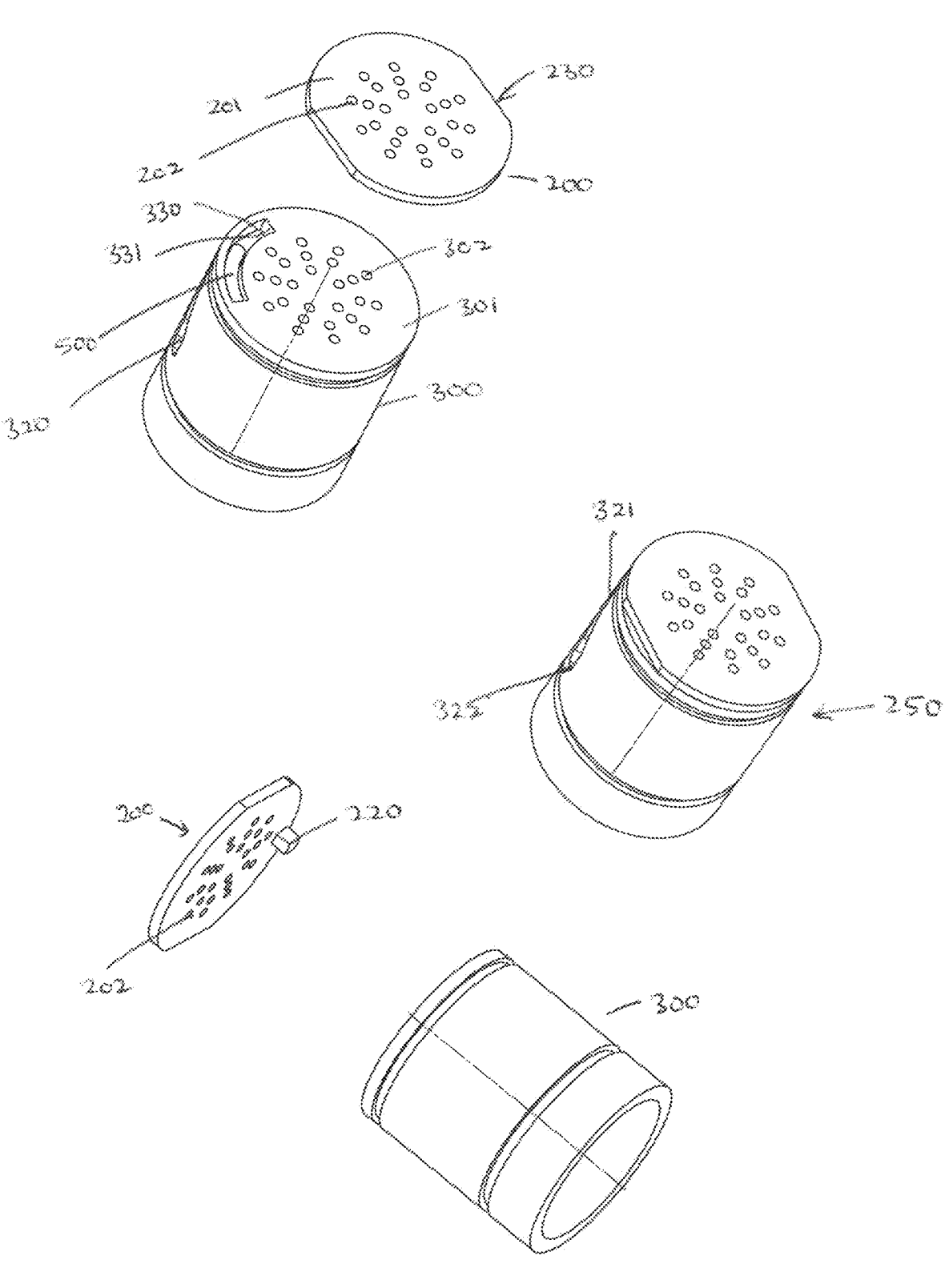
FIG. 6 shows component parts of an assembly as shown in FIG. 5.

FIGS. 3 and 4 show a perspective view and a sectional view of an example of a hydraulic port assembly according to the disclosure.

As with the known fill port assemblies, a housing 10' is provided through which a port 100 (e.g. a fill port or other hydraulic port) is mounted. In the example shown, a second port e.g. an overflow port may also be mounted in the housing 10', but the assembly of the disclosure can also be applied to a hydraulic port assembly which comprises only one port. The housing 10' may be in the form of a simple plate for supporting the port(s).

The first end 103 of the fill port, on one side of the housing 10', is arranged to be attached, in use, to an external connector and/or fill hose. The second end 104 of the fill port, on the other side of the housing 10' is arranged to be in fluid communication with the tank or reservoir to be filled. A fluid flow channel 102 is defined, along axis A, between the first and the second ends.

Located within the fluid flow channel between the first and second ends is a first filter part 200. As will be described further below, this may be in the form of a plate 201 that, when in position in the flow channel, extends across the diameter of the channel. The plate is provided with perforations 202 through which fluid may flow along the flow channel. The perforations are sized to prevent the passage of undesired debris or contaminants past the filter. As mentioned above, in many applications, e.g. in aircraft systems, such filters are mandatory and so the first filter part 200 will already be present. If not, to realise the closure assembly of this disclosure, such a first filter part 200 should be provided to be mounted into the flow channel.

The second part of the closure assembly according to the disclosure is a second filter part 300, which also extends across the flow channel and is provided with perforations 302. The second filter part 300 is arranged to be axially aligned with (axially adjacent to) the first filter part in the flow channel. The second filter part may also be in the form of a plate or, as shown in this example, in the form of a hollow cylinder having a plate end 301 in which the perforations 302 are formed. The second filter part is rotatable (around the axis A) relative to the first filter part so that the locations of the perforations 302 of the second filter part 300 rotate relative to the perforations 202 in the first filter part 200. The first and second filter parts 200, 300, together form a filter unit 250 located in the flow channel.

In the example, the closure assembly further includes a spring 500 which is in engagement with the second filter part 300 and is biased to axially hold the second filter part adjacent to (ideally in axial abutment with) the first filter part.

The filter unit 250 operates as a closure mechanism for the fill port in that the second filter part 200 can rotate relative to the first filter part between a first (open) position in which the perforations 302 in the second filter part align with the perforations 202 in the first filter part, the aligned perforations thus permitting fluid flow through the filter unit, and a second (closed) position where the perforations in the two filter parts are out of alignment. The plate 301 of the second filter 302 thus creates a blind bore of the perforations 202 of the first filter element such that fluid is not able to pass through the filter unit 250.

Various ways of rotating the second filter part 300 relative to the first filter part 200 could be envisaged and the disclosure is not limited in this respect. In one example, however, the rotation of the second filter part may be effected by providing means 320, 324 engaged with the second filter part and extending to the exterior of the port 100 to which a force can be applied to cause rotation of the second filter part. The force may be a rotation force, and may be applied manually. Alternatively, as shown, the means may be configured to receive an axial force and to translate force into rotation of the second filter part 300. In example of how an axial force can be translated into a rotation of the second filter part is described with particular reference to FIGS. 5 to 8. In this example, a track, groove or recess 320 is formed in the second filter part 300 e.g. in the cylindrical wall of the second filter part where this is a cylinder. The track, groove or recess (hereinafter 'groove' for simplicity) has a first end 321 at a first location and a second end 322 at a second location, the second location being spaced axially and circumferentially from the first location such that the groove defines a part-helix shape. The means to which a force may be applied further includes a pin 324 extending from outside the port, through an aperture 113 in the wall 115 of the port into engagement with the groove 322. The aperture 113 is larger than the diameter of the pin 324 so that the pin can move axially within the aperture when an axial force is applied to the pin. As the pin 324 is pressed axially downwards (further describe below) it moves in the groove 322 thus driving rotation of the second filter part 300. The axial force may be applied to the pin manually or, alternatively, by connection of a connector or hose or other fitting to the first end of the port as described further below.

In the example shown, in the first position, the close assembly is closed. This is typically the default position when no fluid is to be filled through the hydraulic port. In an aircraft system, this would be the normal or default state during flight, for example. In the first position, the spring 500 is biased to hold the second filter part in a rotational position, relative to the first filter part, where the perforations of the filter parts are not aligned and so no fluid flows through the filter unit 250.

Accurate location of the first and second filter parts relative to each other and rotation of the second filter part relative to the first filter part is ensured by means of a locating protrusion 220 extending from the first filter part and a locating groove 330 formed in the adjacent part of the second filter element 300 such that the projection 220 locates in the groove 330. The groove 330 is arcuate such that as the secondary filter part rotates, the protrusion 220 travels along the groove 330 between a first end 331 and a second end of the groove. The groove 330 is preferably an open groove such that the protrusion comes into contact with the spring 500 as described further below. The force of the spring 500 biases the closure assembly to the closed position.

Whilst both the first and the second filter element have a generally circular cross-section to extend across the interior of the port, in one example, the first filter part may be provided with flattened sides 230 for the first filter part to engage in a conventional hydraulic port connector. This prevents rotation of the while filter unit when the connector/fitting is applied to the port.

Figure 7:
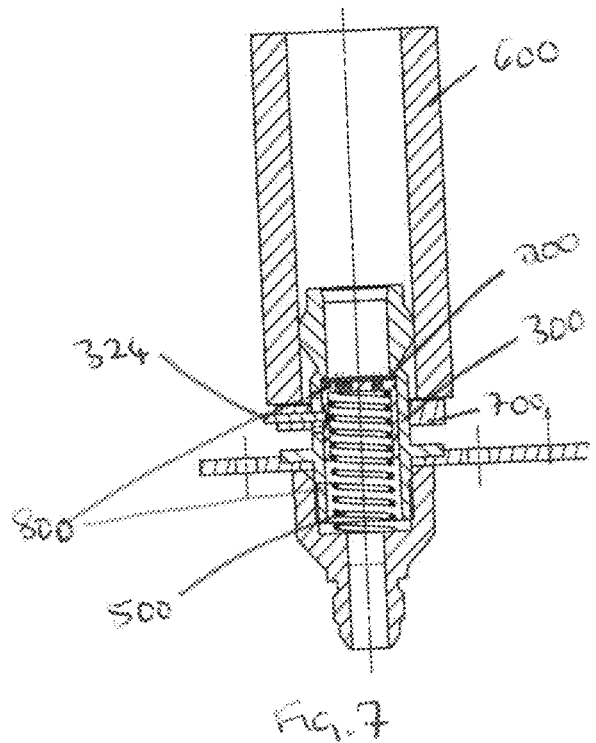
FIG. 7 shows a sectional view of the assembly in an open position in use.
Figure 8:
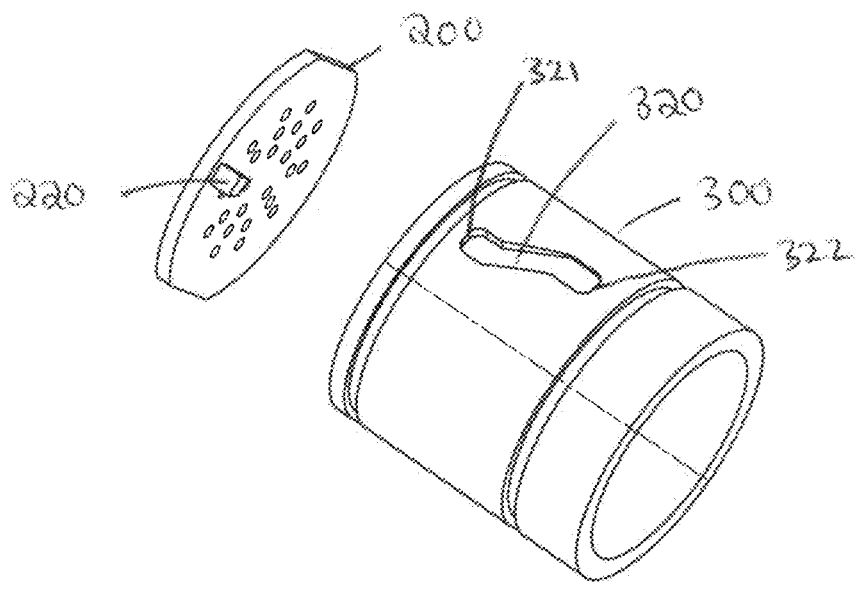
FIG. 8 is provided to example an example of the assembly with an automatic return to the open position.

FIG. 7 shows the closure assembly in the second, open position. In this position, the second filter element 300 is rotated relative to the first to a position in which its perforations are aligned with the perforations of the first filter element.

As mentioned above, this rotation could be performed by applying an axially downward force on the pin 324 which, by engagement in the groove 322, causes the second filter part to rotate. In one example, as shown, the opening of the closure assembly can be performed in an automatic way when an external connector 600, hose etc. is attached to the first end 101 of the port 100. In aircraft applications, this may be performed e.g. by ground maintenance staff. In this example, a flange or sleeve 700 is provided around the port, through which the pin 324 extends. The flange is located such that when the connector 600 is attached to the port it exerts an axially downward force on the flange and, thus, on the pin 324 that extends through the flange. As the pin 324, which is located in the helical groove 220, is pushed downwards, the groove rides along the pin causing rotation of the second filter element. The groove is designed such that when the pin reaches the end 322 of the groove, the perforations in the second filter part are aligned with those of the first filter part to provide a fluid flow passage through the filter unit 250.

The spring 500 maintains the axial position of the second filter part relative to the first to avoid and leakage between the perforations of the two filter parts. O-rings 800 may also be provided between the second filter part and the port to avoid leakage.

As mentioned above, and as illustrated again in FIG. 8, in the example shown, a protrusion 220 extending from the first filter element 200 engages in a groove 330 in the second filter element and contacts, through this groove 330, the spring 500. When moving to the open position, this protrusion 330 therefore compresses the spring 500. Once the external connector 600 is removed, thus removing the axial force on the flange and the pin, the second filter part 300 is released and the spring force causes the second filter part to rotate back to its first (closed) position.

Figures 9A, 9B:
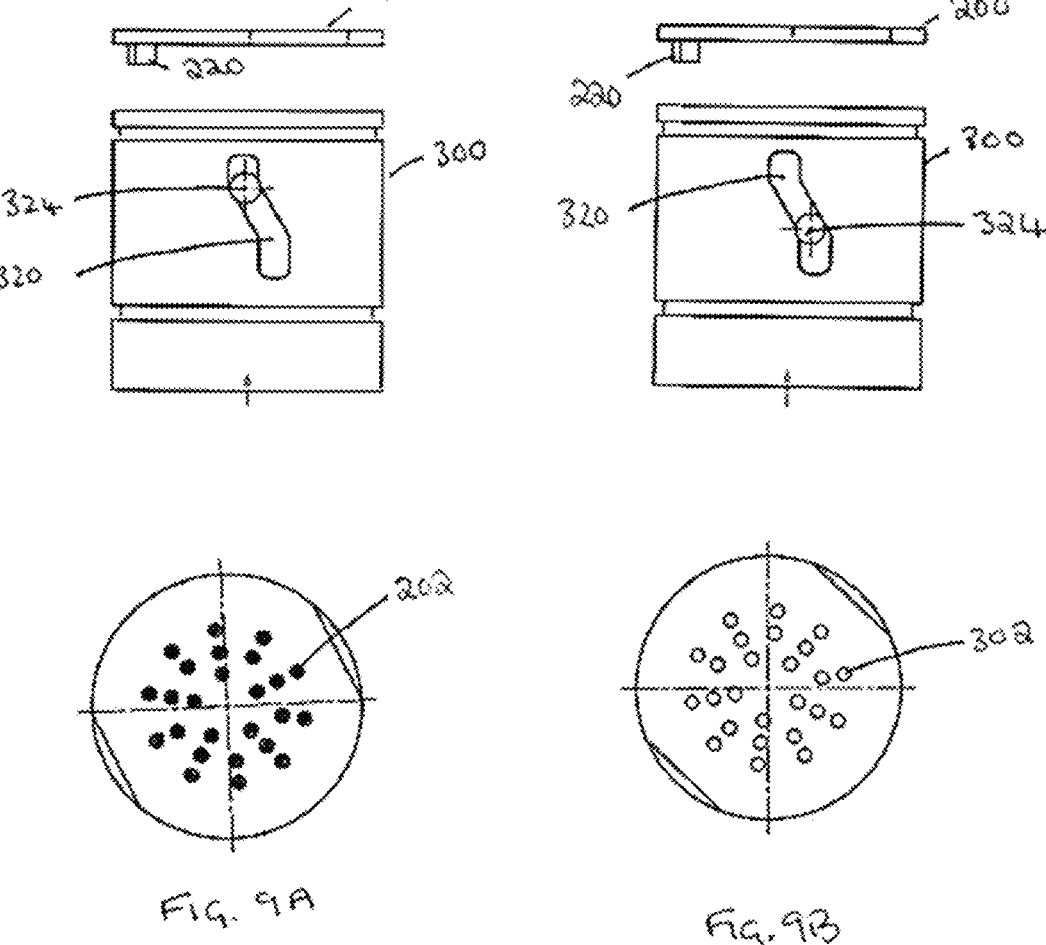
FIGS. 9A and 9B illustrate operation of the assembly.

The first (open) position of the example described can be seen in FIG. 9A and the second (open) position can be seen in FIG. 9B.

Figure 10A:
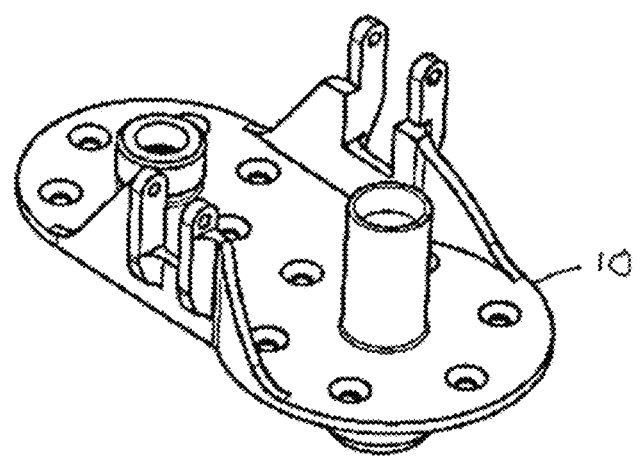
FIGS. 10A and 10B show, for comparison, a housing part of an assembly according to the disclosure and a known housing part of a known assembly.
Figure 10B:
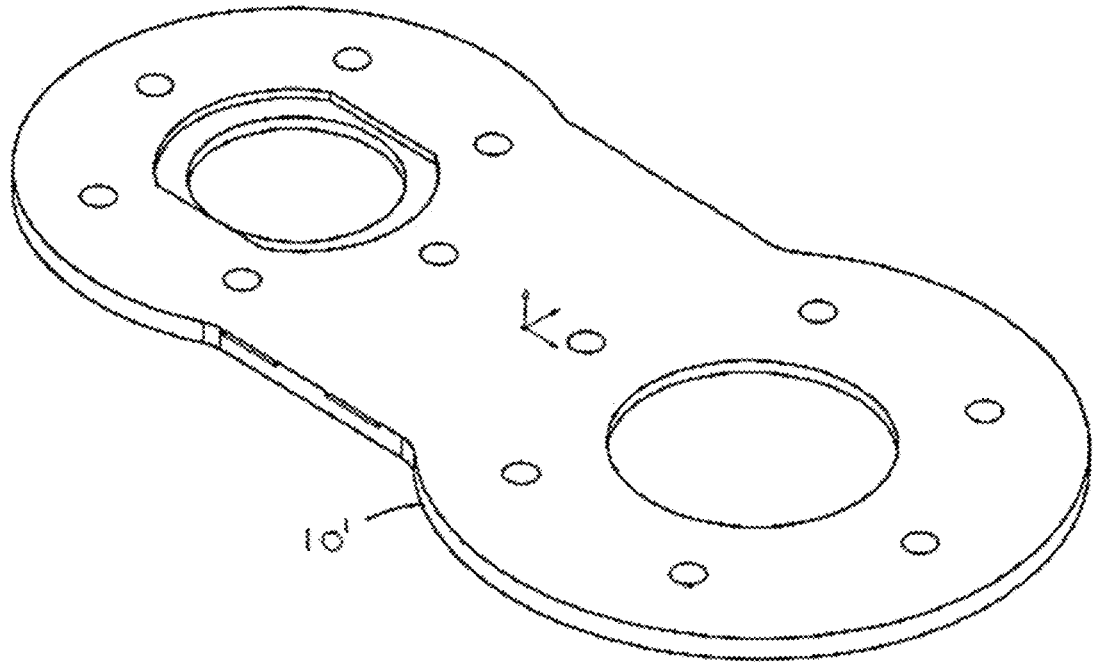

As can be seen by comparing FIGS. 10A and 10B, the housing 10' of the present disclosure is much simpler and lighter and less machined than the housing 10 of the known design. As the housing is usually the most expensive part of the assembly, this is clearly advantageous. Also, a reduction in mass, number of parts and manufacturing costs and complexity is important in many fields including the aircraft industry.

The design of the disclosure avoids the need for flaps and hinges and so reduces the adverse effects of wear of those parts. By having the closures internal to the ports and, in some cases, opened automatically on attachment of a hose or connector, the opening and closing function requires much less space and the envelope of the assembly is greatly reduced. Furthermore, the assembly can be easily inspected for damage.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A hydraulic port assembly comprising:
a housing having an opening therethrough;
a first port located in and extending through the opening defining a flow channel through the first port from a first end to a second end, the flow channel having an axis (A) defined between the first end and the second end; and
a closure mechanism moveable between an open position in which the flow channel is open and allows fluid flow therethrough and a closed position in which the flow channel is closed and prevents fluid flow therethrough, wherein the closure mechanism comprises:
a filter unit comprising a first filter part located in the flow channel, and having perforations formed therein to allow fluid flow in the flow channel through the first filter part; and
a second filter part located in the flow channel axially adjacent the first filter element, the second filter element being rotatable about the axis (A) relative to the first filter element, the second filter element having perforations formed therein to allow fluid flow in the flow channel through the second filter part, the second filter part rotatable, relative to the first filter part, about the axis (A) between a first position in which the perforations of the second filter part are aligned with the perforations of the first filter part allowing fluid flow through the filter unit, and a second position in which the perforations of the second filter part are not aligned with the perforations of the first filter part such as to prevent fluid flow through the filter unit, the closure mechanism further comprising a spring in contact with the second filter part configured to bias the second filter part axially against the first filter part.

2. The assembly of claim 1, the closure mechanism further comprising: means for providing an external force to the second filter part to cause the rotation thereof.

3. The assembly of claim 2, wherein the means for providing the external force comprises a pin engaging with the second filter part and extending through the port to the exterior of the port.

4. The assembly of claim 3, wherein the means for providing an external force includes means for translation the axial external force to a rotational force to cause the rotation of the second filter part.

5. The assembly of claim 4, wherein the means for translation comprises a helically extending groove in the second filter part, and wherein the pin engages with the groove when the external axial force is applied to the pin such that the groove rides on the pin to cause the rotation.

6. The assembly of claim 5, further comprising:

a flange mounted around the port and configured to be engaged by a connector applied to the port, the flange engaging with the second filter part such that application of the connector to the port causes the rotation of the second filter part via the flange, wherein the pin extends through the flange such that axially downward movement of the flange caused by application of the connector causes axially downward movement of the pin and causes the groove to ride on the pin causing rotation of the second filter part.

7. The assembly of claim 1, further comprising: a flange mounted around the port and configured to be engaged by a connector applied to the port, the flange engaging with the second filter part such that application of the connector to the port causes the rotation of the second filter part via the flange.

8. The assembly of claim 1, wherein a groove is formed in the second filter part and a protrusion is formed on the first filter element, wherein the protrusion engages with the spring (500) through the groove as the second filter part rotates relative to the first filter part.

9. The assembly of claim 1, wherein the first filter part has flattened sides.

10. The assembly of claim 1, wherein the housing is in the form of a substantially flat plate.

11. The assembly of claim 1, wherein the housing has:

a second opening therethrough; and a second port located in and extending through the second opening defining a second flow channel through the second port from a first end to a second end, the second flow channel having a second axis defined between the first end and the second end.

12. The assembly of claim 1, wherein the first port is a fill port.

13. The assembly of claim 1, wherein the first port is configured to have a hose attached thereto.

14. The assembly of claim 1 configured for attachment to an aircraft water system.

\* \* \* \* \*